US011045916B2

(12) United States Patent
Takada et al.

(10) Patent No.: US 11,045,916 B2
(45) Date of Patent: Jun. 29, 2021

(54) MACHINE TOOL

(71) Applicant: MAKING MILLING MACHINE CO., LTD., Tokyo (JP)

(72) Inventors: Daisuke Takada, Aiko-gun (JP); Keisuke Tange, Aiko-gun (JP); Kazumasa Nakayasu, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 158 days.

(21) Appl. No.: 16/329,600

(22) PCT Filed: Sep. 9, 2016

(86) PCT No.: PCT/JP2016/076667
§ 371 (c)(1),
(2) Date: Feb. 28, 2019

(87) PCT Pub. No.: WO2018/047301
PCT Pub. Date: Mar. 15, 2018

(65) Prior Publication Data
US 2019/0217436 A1    Jul. 18, 2019

(51) Int. Cl.
*B23Q 3/157* (2006.01)
*B23Q 11/08* (2006.01)
(Continued)

(52) U.S. Cl.
CPC ...... *B23Q 3/15706* (2013.01); *B23Q 11/0825* (2013.01); *B23Q 11/0891* (2013.01);
(Continued)

(58) Field of Classification Search
CPC ......... Y10T 483/115; Y10T 409/30392; Y10T 409/401925; Y10S 408/71; B23Q 11/08–0891
(Continued)

(56) References Cited

U.S. PATENT DOCUMENTS 4,597,698 A * 7/1986 Liebetrau ............... B23Q 11/08
160/352
5,897,430 A * 4/1999 Haller ................ B23Q 11/0891
451/451
(Continued)

FOREIGN PATENT DOCUMENTS

CN        203592354 U    5/2014
CN        104493491 A    4/2015
(Continued)

*Primary Examiner* — Erica E Cadugan
*Assistant Examiner* — Michael Vitale
(74) *Attorney, Agent, or Firm* — Morrison & Foerster LLP

(57) ABSTRACT

This machine tool comprises a machining chamber in which machining of a workpiece is performed, and a tool storage chamber in which a plurality of tools are stored. The machine tool is further provided with a partition which partitions the machining chamber and tool storage chamber from one another. The machine tool is positioned on the front side of the machining chamber, and is equipped with a first sliding door that moves in the width direction, and a second sliding door that is positioned on the front side of the tool storage chamber and that moves in the width direction. The first sliding door and second sliding door are positioned in such a manner that one of the sliding doors is positioned on the front side of the other sliding door, and when one of the sliding doors is opened, said door overlaps with the other sliding door.

5 Claims, 9 Drawing Sheets

(51) Int. Cl.
 *B23Q 3/155* (2006.01)
 *B23C 1/06* (2006.01)
 *B23Q 1/01* (2006.01)

(52) U.S. Cl.
 CPC ............... *B23C 1/06* (2013.01); *B23Q 1/015* (2013.01); *B23Q 3/15539* (2016.11); *B23Q 3/15766* (2013.01); *Y10T 483/115* (2015.01); *Y10T 483/1795* (2015.01); *Y10T 483/1855* (2015.01); *Y10T 483/1882* (2015.01)

(58) Field of Classification Search
 USPC ............. 483/3; 451/451, 455; 409/134, 254; 408/710
 See application file for complete search history.

(56) References Cited

U.S. PATENT DOCUMENTS

| | | | | |
|---|---|---|---|---|
| 6,749,495 B2 * | 6/2004 | Grund | ................ | B23Q 11/0816 409/134 |
| 6,987,241 B2 * | 1/2006 | Hacker | .............. | B23Q 11/0825 160/222 |
| 8,844,104 B2 * | 9/2014 | Gray | .................... | B23Q 39/027 29/27 C |
| 10,324,449 B2 * | 6/2019 | Ishii | ...................... | G05B 19/404 |
| 2009/0075795 A1 | 3/2009 | Okabe et al. | | |
| 2013/0199333 A1 * | 8/2013 | Sato | ......................... | F16P 3/02 74/612 |
| 2015/0252604 A1 * | 9/2015 | Inaguchi | ............. | E05D 15/0652 49/409 |
| 2016/0214805 A1 * | 7/2016 | Ebihara | .................... | B23Q 7/04 |
| 2018/0032052 A1 * | 2/2018 | Ishii | ................... | B23Q 11/0891 |

FOREIGN PATENT DOCUMENTS

| | | | | | |
|---|---|---|---|---|---|
| DE | | 3513944 A1 | * | 10/1986 | ......... B23Q 11/0825 |
| EP | | 0331178 A1 | * | 9/1989 | ............. B23B 39/00 |
| GB | | 2271945 A | * | 5/1994 | |
| JP | | 63062636 A | * | 3/1988 | ............ B23Q 11/08 |
| JP | | 2-35657 | | 3/1990 | |
| WO | WO-2016135958 A1 | | * | 9/2016 | ............. B23Q 16/02 |

\* cited by examiner

MACHINE TOOL

CROSS-REFERENCE TO RELATED APPLICATIONS

This application is a U.S. national phase patent application of International Patent Application No. PCT/JP2016/076667, filed Sep. 9, 2016, which is hereby incorporated by reference in the present disclosure in its entirety.

FIELD OF THE INVENTION

The present invention relates to a machine tool.

BACKGROUND OF THE INVENTION

In a machining area for machining workpieces, a table for fixing workpieces and a spindle head for holding a tool are disposed. Since chips and cutting fluid for cooling the tool scatter in the machining area, a machining chamber is formed around the machining area. Furthermore, a machine tool including a tool exchange device for automatically changing a tool attached to the spindle head is known. In the machine tool including the tool exchange device, the machining chamber is formed so as to prevent chip and cutting fluid from scattering out of the machine tool.

Japanese Unexamined Utility Model Publication No. 2-35657 discloses a machine tool including a splash guard covering the front and the sides of the machine tool. Moreover, this document discloses that the splash guard covering the front includes sliding doors that are opened in multiple stages.

CITATION LIST

Patent Literature

Patent Literature 1: Japanese Unexamined Utility Model Publication No. 2-35657U

BRIEF SUMMARY OF THE INVENTION

The tool exchange device for changing a tool to be attached to the spindle head can be disposed outside the wall of the machining chamber. It is necessary for an operator to perform a predetermined operation on the tool exchange device. For example, the operator has to change the tool stored in the tool exchange device or perform maintenance of the tool exchange device.

In the prior art, the doors that open and close on the side panel of the machine tool are disposed for the maintenance of the tool exchange device and the exchange of the tool. For example, when the tool stored in the tool exchange device is changed, the operator moves to the side of the machine tool, opens the door for the exchange of the tool, and changes the tool. Thus, a work space for the operation of the operator is necessary on the side of the machine tool. As a result, there is a problem that the length of the installation area of the machine tool in the width direction is increased. Furthermore, since the operator has to move to the side of the machine tool in the operation of the tool exchange device, there is a problem that workability is deteriorated.

An object of the present invention is to provide a machine tool that can be installed in narrow space with high workability.

A machine tool of the present invention includes a machining chamber for machining a workpiece and a tool storage chamber for storing a plurality of tools. The machine tool includes a frame containing the machining chamber and the tool storage chamber and a partition wall that is disposed in the frame and separates the machining chamber and the tool storage chamber. The machine tool includes a first sliding door that is disposed at the front side of the machining chamber and which moves in the width direction of the machine tool and a second sliding door that is disposed at the front of the tool storage chamber and which moves in the width direction of the machine tool. The first sliding door has a length in which the front side of the machining chamber is opened in the width direction. The second sliding door has a length in which the front side of the tool storage chamber is opened in the width direction. The first sliding door and the second sliding door are formed so that one door is disposed in front of the other door and overlaps the other door when the one door is opened.

In the invention described above, the second sliding door can be disposed in front of the first sliding door. When the first sliding door is opened, the first sliding door can be disposed on the inner side of the second sliding door.

In the invention described above, the first sliding door can include a first window through which the inside of the machining chamber is viewable when the first sliding door is closed. The second sliding door can include a second window through which the inside of the tool storage chamber is viewable when the second sliding door is closed. The window of one of the sliding doors and the window of the other sliding door are formed so as to at least partially overlap each other when one of the sliding doors is opened.

In the invention described above, the first sliding door can have a length in which the machining chamber is opened in the height direction. The second sliding door has a length in the height direction that extends from the bottom to the top of the frame.

In the invention described above, the machine tool can be provided with a spindle head that is disposed in the machining chamber and which is movable in the width direction of the machine tool, a tool magazine that is disposed in the tool storage chamber, and a shutter that is disposed on the partition wall. The partition wall can include an opening that is formed above the tool magazine and allows the machining chamber and the tool storage chamber to communicate with each other. The shutter can be formed so as to open and close the opening. The machining chamber can include a machining area for machining the workpiece and an exchange area for changing the tool. The exchange area is disposed on one end of the machining chamber in the width direction and can be disposed above the tool magazine. The spindle head can be formed so as to vertically move while the shutter is opened, whereby a tool is changed through the opening.

According to the present invention, a machine tool that can be installed in narrow space and which has high workability can be provided.

DETAILED DESCRIPTION OF THE INVENTION

Referring to FIGS. 1 to 9, a machine tool according to an embodiment will be described below. In the present embodiment, a numerically controlled machine tool will be described as an example.

Figure 1:
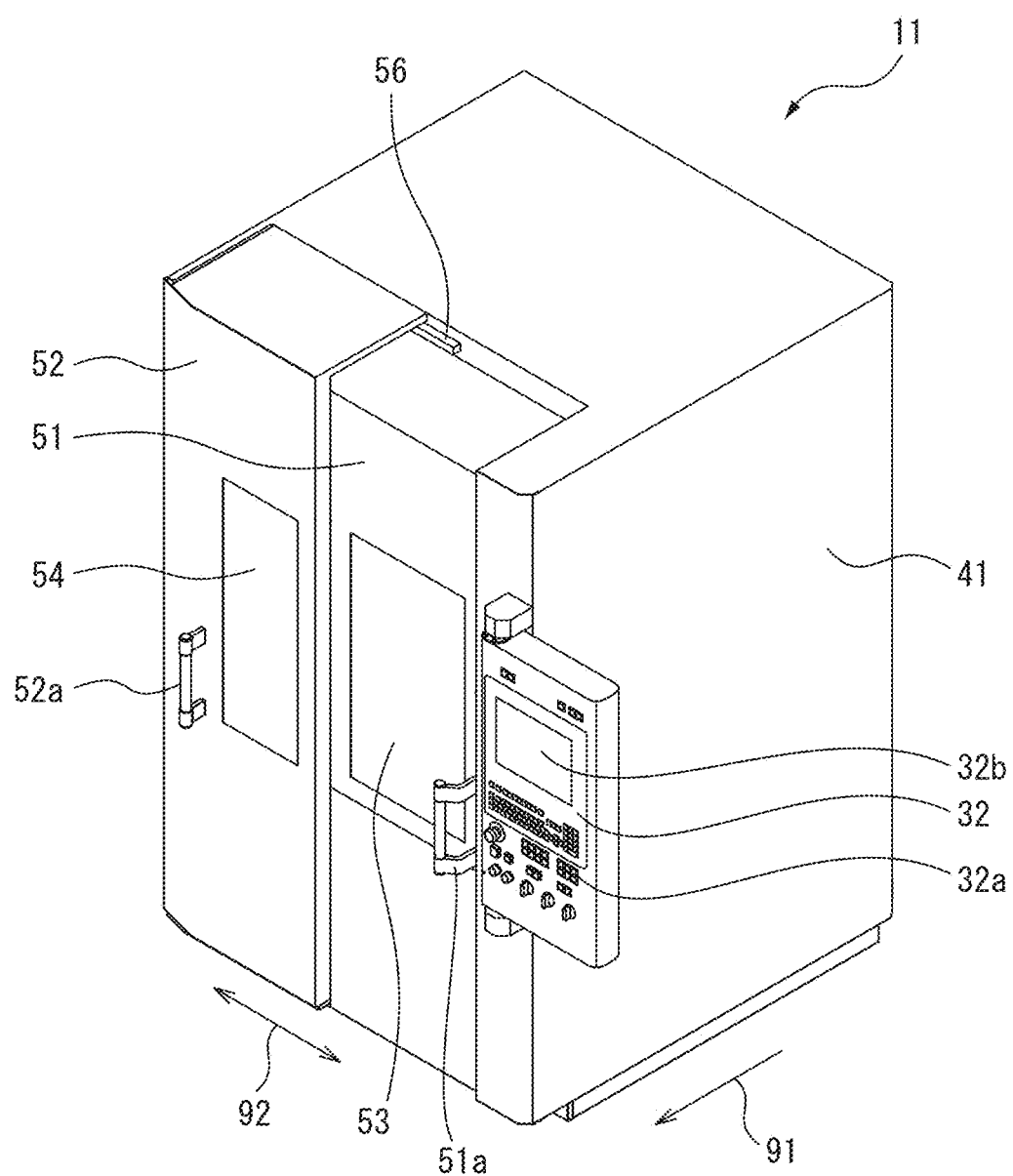
FIG. 1 is a perspective view of a machine tool according to an embodiment.
Figure 2:
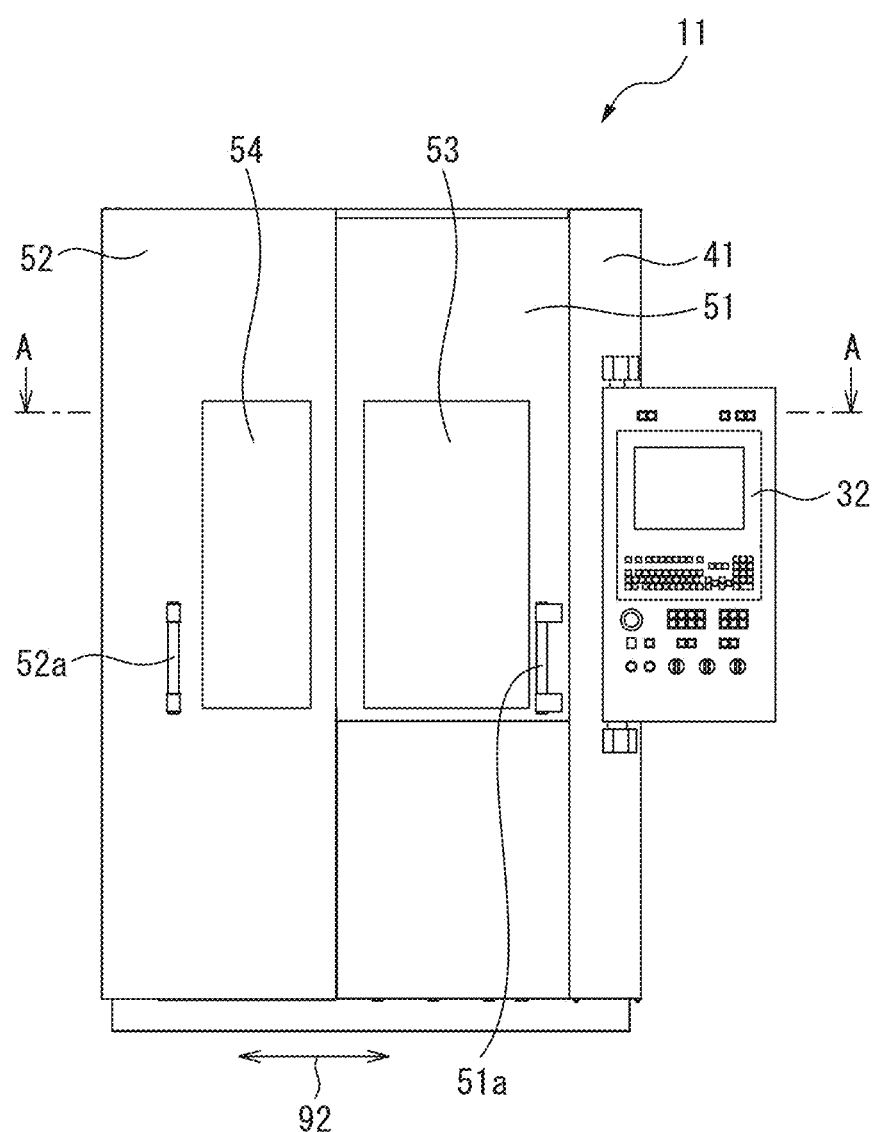
FIG. 2 is a front view of the machine tool according to the embodiment.

FIG. 1 is a perspective view of the machine tool according to the present embodiment. FIG. 2 is a front view of the machine tool according to the present embodiment. Referring to FIG. 1 and FIG. 2, the side of a machine tool 11 on which the operator stands will be referred to as the front side of the machine tool 11. A direction indicated by arrow 91 corresponds to the front side of the machine tool 11. FIG. 2 illustrates the machine tool 11 as viewed from the front side. Moreover, the left and right direction of the machine tool 11 will be referred to as the width direction of the machine tool when the operator stands in front of the machine tool 11. In FIG. 1, the direction indicated by arrow 92 is the width direction of the machine tool 11.

The machine tool 11 includes a frame 41 serving as a housing. The frame 41 is shaped like a plate. The frame 41 is formed so as to surround a spindle head and a tool exchange device or the like that are disposed in the frame 41. The machine tool 11 includes a first sliding door 51 disposed at the front side of the frame 41 and a second sliding door 52 disposed at the front side of the frame 41. The first sliding door 51 is a door for opening a machining chamber for machining a workpiece. The second sliding door 52 is a door for opening a region including a tool storage chamber for storing tools. The first sliding door 51 and the second sliding door 52 are formed so as to move in the width direction as indicated by arrow 92.

The first sliding door 51 includes a first window 53 for viewing the inside of the machining chamber when the first sliding door 51 is closed. The second sliding door 52 includes a second window 54 for viewing the inside of the tool storage chamber when the second sliding door 52 is closed. The first window 53 and the second window 54 are composed of transparent members such as glass.

Figure 3:
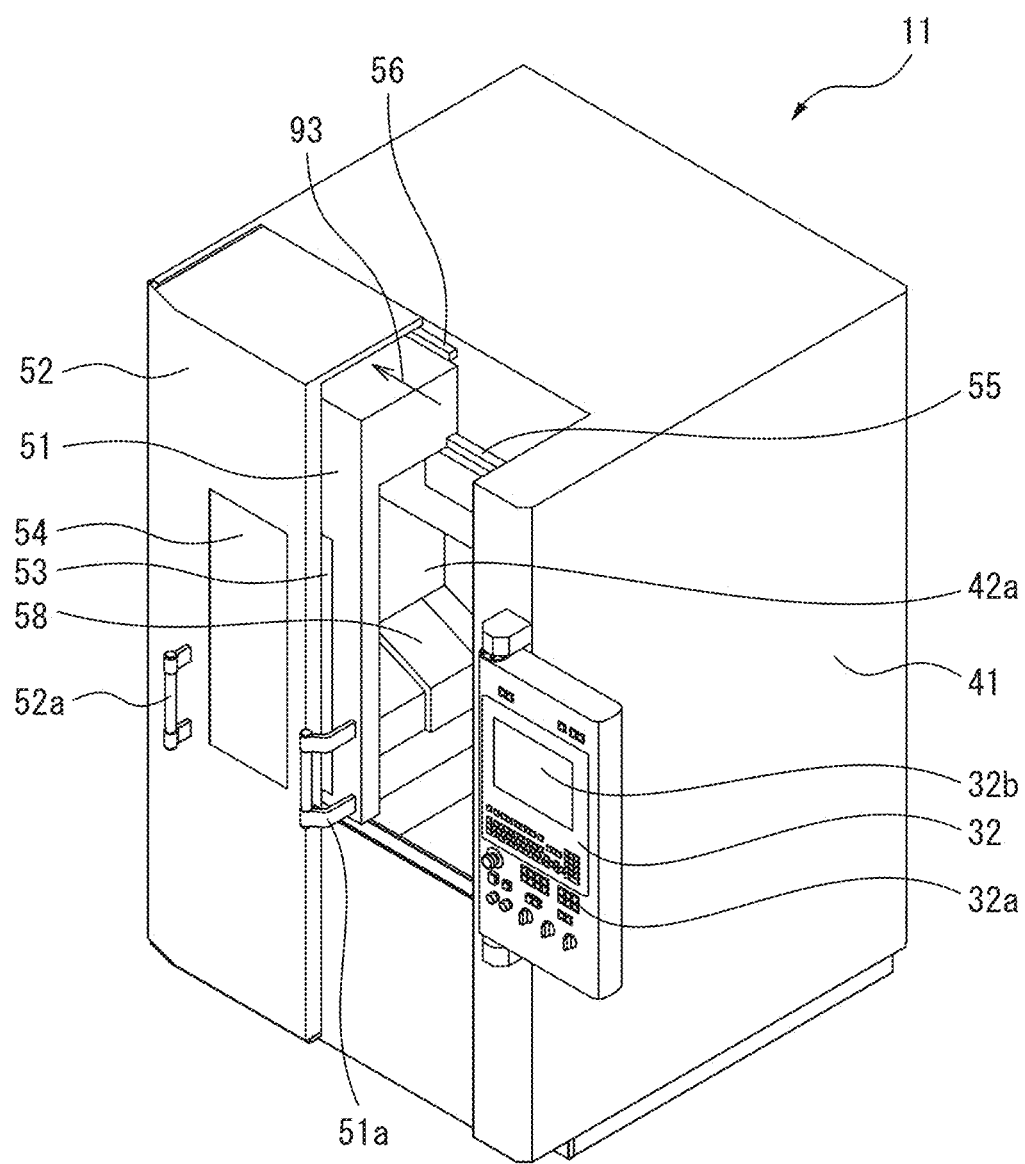
FIG. 3 is a perspective view of the machine tool when a first sliding door is opened.
Figure 4:
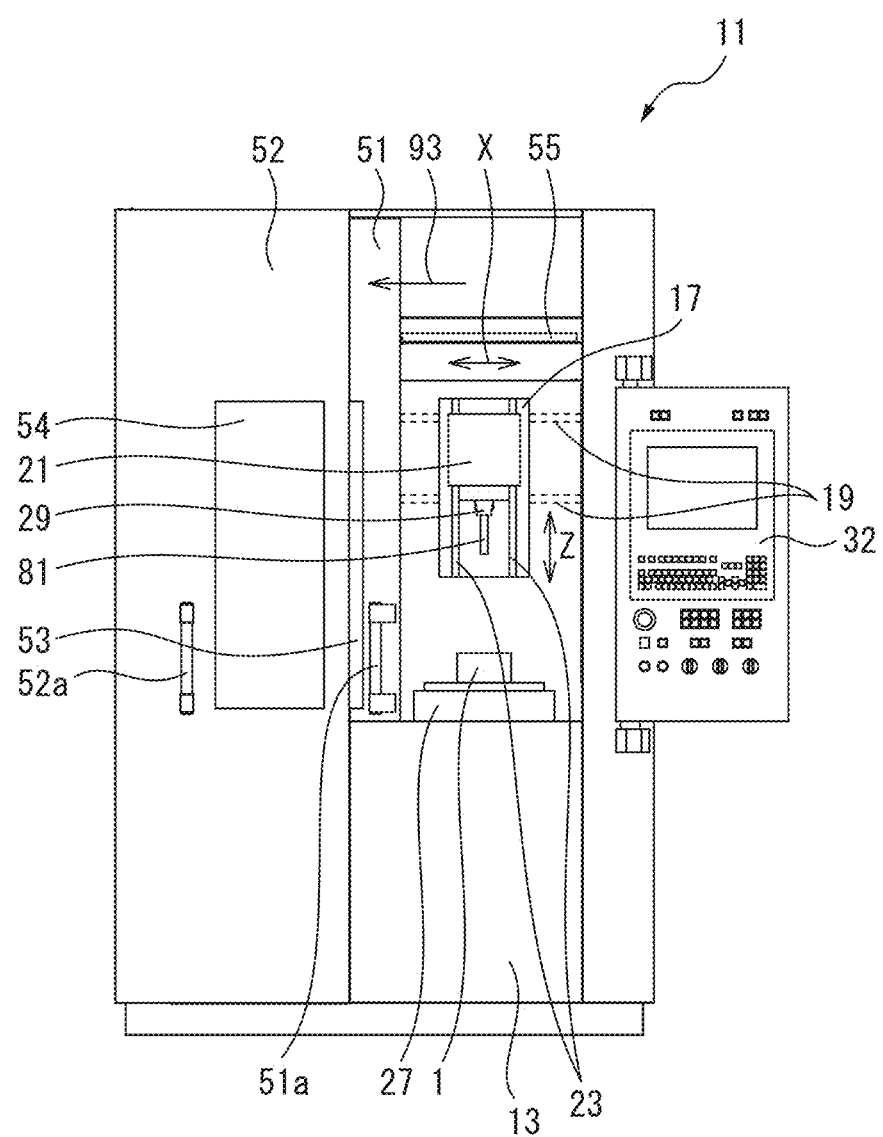
FIG. 4 is a front view of the machine tool when the first sliding door is opened.
Figure 5:
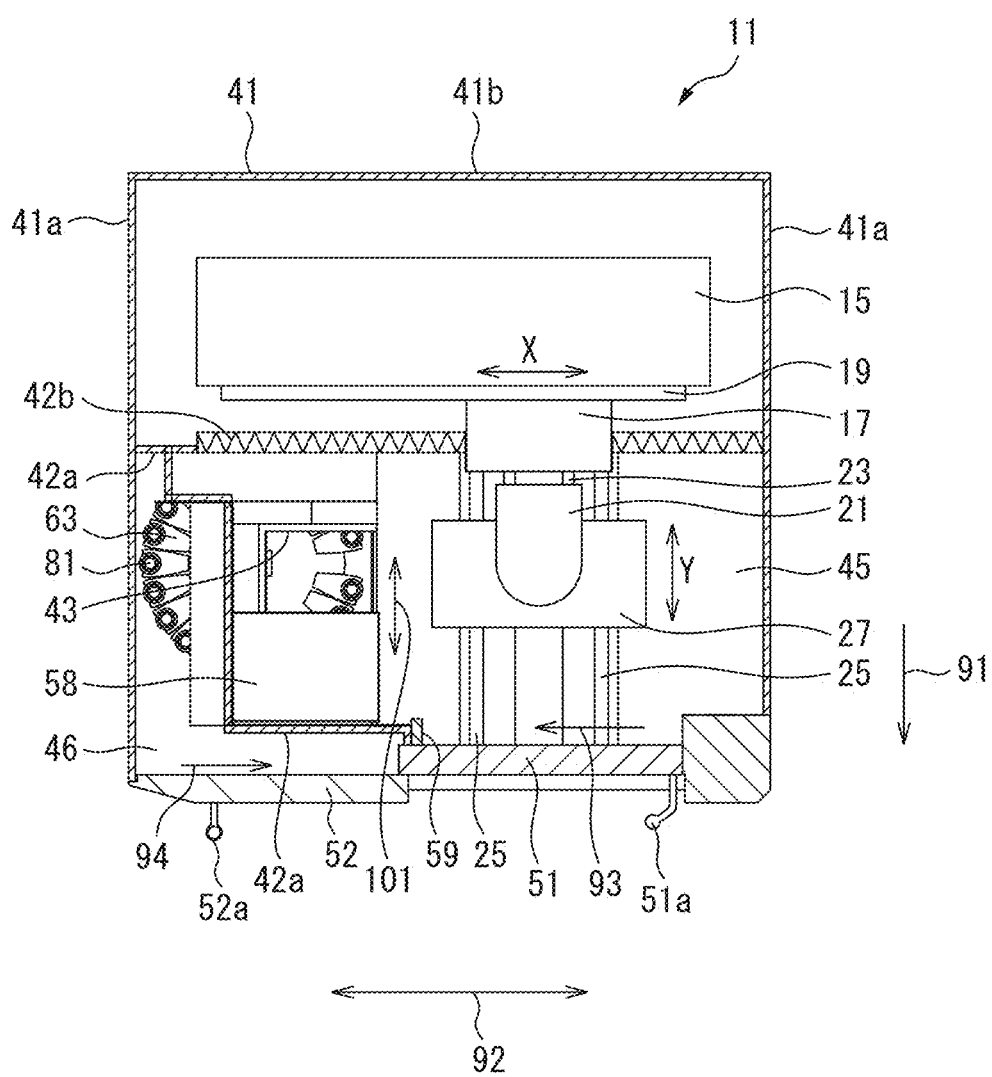
FIG. 5 is a schematic cross-sectional view of the machine tool.

FIG. 3 shows a perspective view of the machine tool when the first sliding door is opened. FIG. 4 shows a front view of the machine tool when the first sliding door is opened. FIG. 5 shows a schematic cross-sectional view of the machine tool according to the present embodiment. FIG. 5 is a cross-sectional view taken along line A-A of FIG. 2.

Referring to FIGS. 3 to 5, the machine tool 11 includes a bed 13 serving as a pedestal and a column 15 erected on the top surface of the bed 13. On the top surface of the bed 13, a table 27 is disposed in front of the column 15. A workpiece 1 is fixed to the table 27. A saddle 17 is disposed at the front side of the column 15. Moreover, a spindle head 21 is disposed at the front side of the saddle 17. A tool 81 for machining the workpiece 1 is attached to the spindle head 21. The tool 81 is attached to the spindle head 21 with a tool holder 29.

The machine tool 11 includes a movement device that changes the relative position of the tool 81 and the workpiece 1. In the present embodiment, the spindle head 21 moves in the Z-axis direction extending in the vertical direction. The saddle 17 moves in the X-axis direction extending in the horizontal direction. Moreover, the table 27 moves in the Y-axis direction extending in the horizontal direction. The movement device of the present embodiment can move the tool 81 relative to the workpiece 1 in the X-axis direction, Y-axis direction, and Z-axis direction.

The movement device includes an X-axis movement device. The X-axis movement device includes a pair of X-axis rails 19 formed on the front surface of the column 15 and a motor for moving the saddle 17. The saddle 17 is formed so as to reciprocate along the X-axis rails 19. The spindle head 21 and the tool 81 move with the saddle 17 in X-axis direction. The movement device includes a Y-axis movement device. The Y-axis movement device includes a pair of Y-axis rails 25 disposed on the bed 13 and a motor for moving the table 27. The table 27 is formed so as to reciprocate along the Y-axis rails 25. The workpiece 1 moves with the table 27 in Y-axis direction.

The movement device includes a Z-axis movement device. The Z-axis movement device includes a pair of Z-axis rails 23 formed on the front surface of the saddle 17 and a motor for moving the spindle head 21. The spindle head 21 is formed so as to reciprocate along the Z-axis rails 23. The tool 81 moves with the spindle head 21 in Z-axis direction and X-axis direction. Moreover, a motor for rotating a spindle about a rotary axis is disposed in the spindle head 21.

The movement device of the present embodiment includes the three linear-motion axes, but the embodiment is not limited to this. The movement device can be formed with any drive axes so as to change the position of the tool relative to the workpiece.

The machine tool of the present embodiment includes a controller. The controller includes an operation panel 32 for inputting predetermined information or displaying predetermined information. The operation panel 32 has an input unit 32a including a keyboard for inputting the predetermined information and a display unit 32b for displaying information relating to the machining.

The controller is provided with, for example, an electronic control unit including a CPU (Central Processing Unit), RAM (Random Access Memory), and ROM (Read Only Memory) that are connected to one another via a bus. The controller controls the motor of the movement device so as to move the tool 81 relative to the workpiece 1.

The machine tool 11 of the present embodiment includes a machining chamber 45 for machining the workpiece 1 and a tool storage chamber 46 for storing a plurality of tools. Devices for machining the workpiece 1 such as the table 27 and the spindle head 21 are disposed in the machining chamber 45. Moreover, a device for storing tool such as a tool magazine is disposed in the tool storage chamber 46.

The machining chamber 45 and the tool storage chamber 46 are disposed in the frame 41. The machining chamber 45 and the tool storage chamber 46 are separated by a partition wall 42a. The partition wall 42a is disposed in the frame 41. An extendable part 42b is disposed behind the spindle head 21. The extendable part 42b extends or retracts in accordance with the movement of the saddle 17 when the saddle 17 moves in X-axis direction. The extendable part 42b is formed by bellows, etc. The frame 41 has side panels 41a and a rear panel 41b. The machining chamber 45 is surrounded by the partition wall 42a, the extendable part 42b, and the side panels 41a of the frame 41. The partition wall 42a, the extendable part 42b, and the frame 41 act as a splash guard disposed around the machining chamber 45.

The machine tool 11 of the present embodiment includes a tool exchange device for automatically changing the tool 81 to be attached to the spindle head 21. The tool exchange device includes a tool magazine 63 for storing a plurality of the tools 81. The tool exchange device of the present embodiment is controlled by the controller of the machine tool so as to automatically change the tool.

The first sliding door 51 is disposed at the front side of the machining chamber 45 when the first sliding door 51 is closed. The first sliding door 51 moves along a guide rail 55 extending in the width direction of the machine tool 11. The first sliding door 51 constitutes the front panel of the machine tool 11. The first sliding door 51 acts as a splash guard disposed around the machining chamber 45. By closing the first sliding door 51, the internal space of the machining chamber 45 is closed. The workpiece 1 can be machined in the machining chamber 45 while the first sliding door 51 is closed. During the period in which the workpiece 1 is machined, the controller can lock the first sliding door 51 so as to keep the first sliding door 51 closed. Chip and cutting fluid (coolant) scatter in the machining chamber 45 during the period in which the workpiece 1 is machined. However, the space of the machining chamber 45 is closed and thus can suppress the scattering of chip and cutting fluid out of the machine tool.

The first sliding door 51 has a handle 51a to be held by the operator. The second sliding door 52 has a handle 52a to be held by the operator. The operator holds the handle 51a and moves the first sliding door 51 to the central part in the width direction. The operator can open the first sliding door 51 by moving the first sliding door 51 in the direction of arrow 93. Moreover, the operator can close the first sliding door 51 by moving the first sliding door 51 in the direction opposite to arrow 93.

By opening the first sliding door 51, the operator can operate a device arranged in the machining chamber 45. For example, the operator can change the workpiece 1 fixed on the table 27 or perform maintenance of the spindle head 21 and the table 27.

Figure 6:
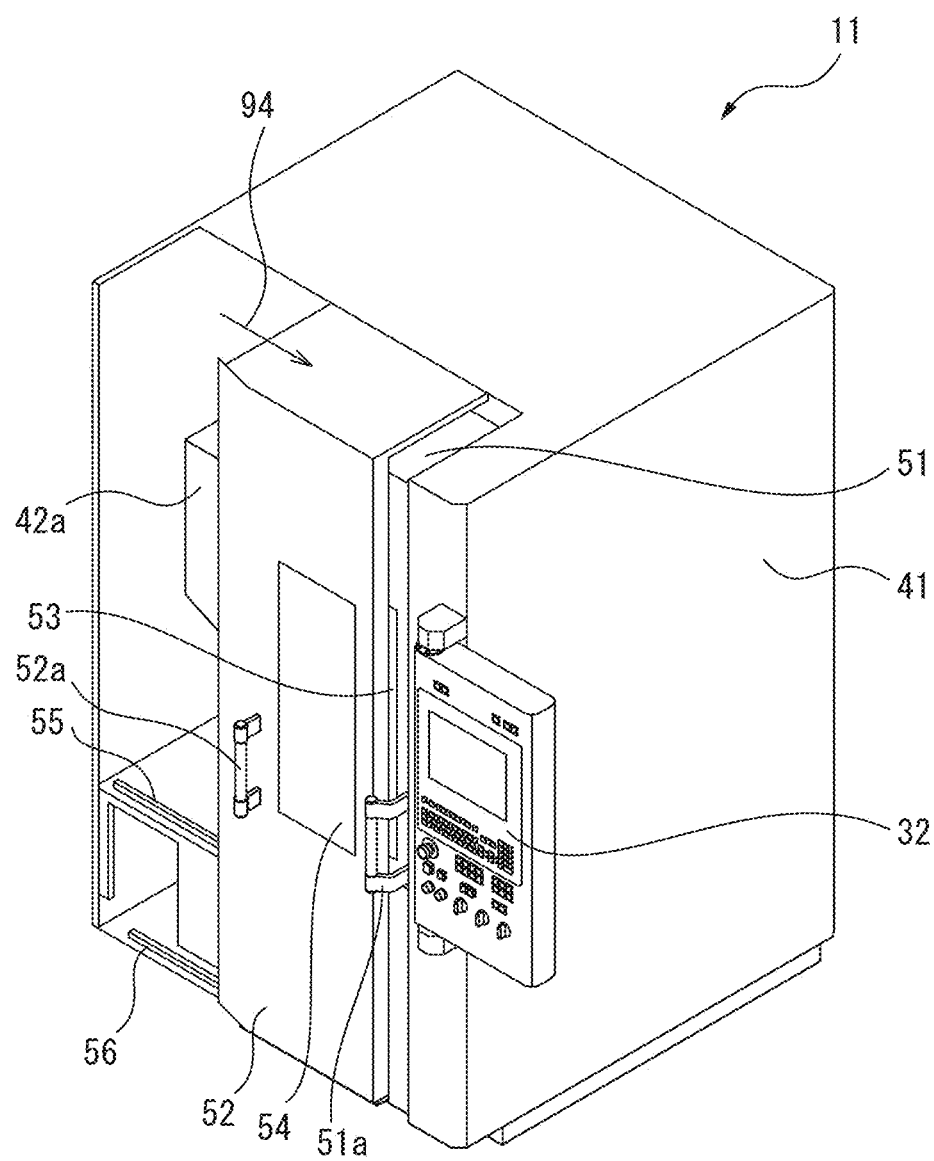
FIG. 6 is a perspective view of the machine tool when a second sliding door is opened.
Figure 7:
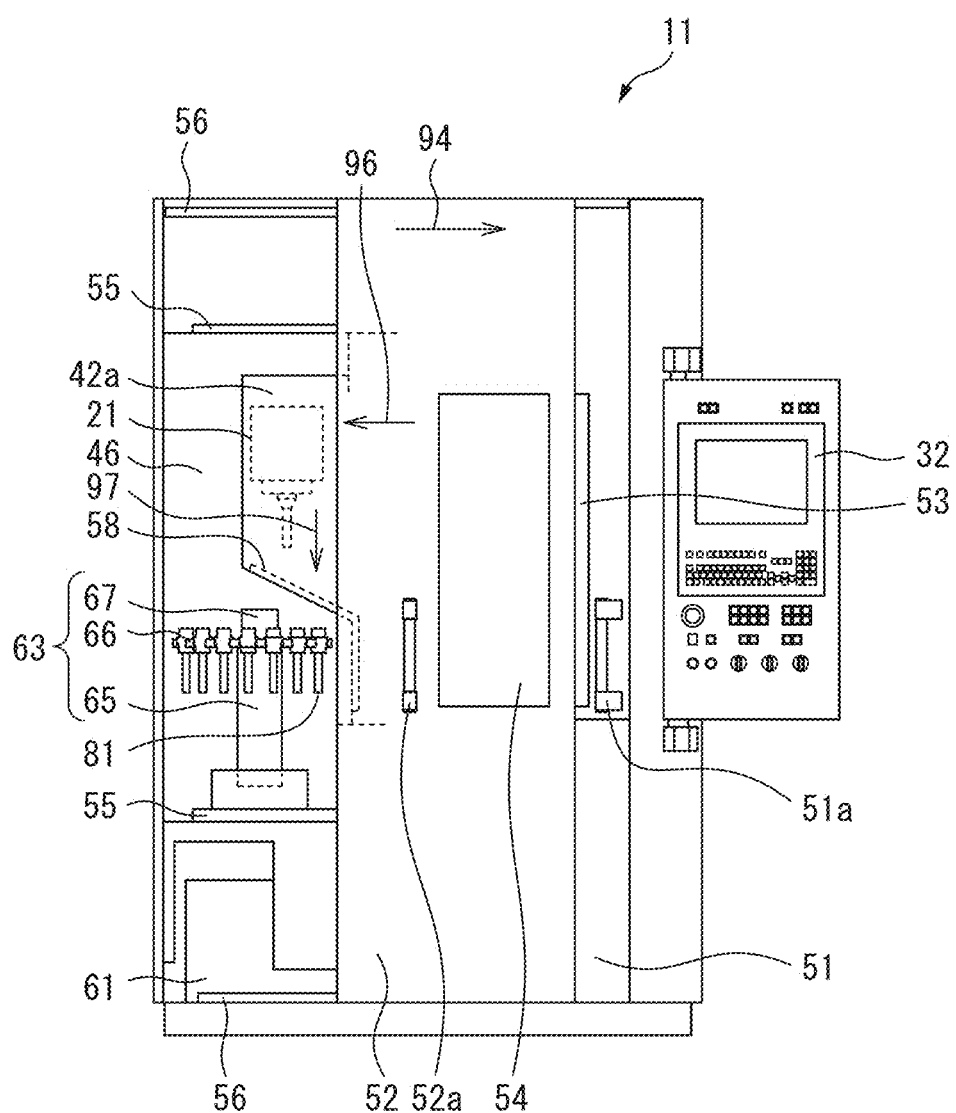
FIG. 7 is a front view of the machine tool when the second sliding door is opened.

FIG. 6 shows a perspective view of the machine tool when the second sliding door is opened. FIG. 7 shows a front view of the machine tool when the second sliding door is opened. Referring to FIG. 6 and FIG. 7, the second sliding door 52 is disposed at the front side of the tool storage chamber 46 when the second sliding door 52 is closed. The second sliding door 52 moves along a guide rail 56 in the width direction of the machine tool 11. The operator holds the handle 52a and moves the second sliding door 52 to the central part in the width direction. The operator can open the second sliding door 52 by moving the second sliding door 52 in the direction of arrow 94. Moreover, the operator can close the second sliding door 52 by moving the second sliding door 52 the direction opposite to arrow 94.

The tool magazine 63 of the present embodiment is a disc magazine for holding a plurality of the tools 81. The tool magazine 63 includes a disc part 66 for holding the plurality of the tools 81. The disc part 66 is disposed on the circumference part and includes grippers for holding the tools 81.

The tool magazine 63 includes a magazine base 65 supporting the disc part 66. The magazine base 65 of the present embodiment is formed in the cylindrical shape. The magazine base 65 is formed so as to be rotated about the central axis by a motor 67. The disc part 66 rotates integrally with the magazine base 65. The motor 67 includes a rotation angle detector that detects the rotation angle of the disc part 66. Any positions of the gripper can be detected by the output of the rotation angle detector.

The machine tool 11 of the present embodiment includes a hydraulic device 61 serving as an auxiliary device of the machine tool. The hydraulic device 61 is disposed below the tool magazine 63. The hydraulic device 61 supplies hydraulic fluid to a device driven by hydraulic fluid. For example, in the spindle head 21, the tool holder 29 is moved when the tool 81 is held or released. The hydraulic device 61 supplies hydraulic fluid to the spindle head 21 in order to move the tool holder 29.

By opening the second sliding door 52, the operator can operate the tool magazine 63 or the like disposed in the tool storage chamber 46. For example, the operator can change the tool disposed at the tool magazine 63 or inspect the tool magazine 63. Furthermore, the operator can perform maintenance or inspection of the hydraulic device 61 disposed in the lower part of the tool storage chamber 46. For example, the operator can refill the hydraulic device 61 with hydraulic fluid.

Referring to FIGS. 3 to 7, the first sliding door 51 has a length in the width direction such that the length corresponds to the width of the machining chamber 45. The first sliding door 51 also has a length in the width direction, in which the front side of the machining chamber 45 is opened. The second sliding door 52 has a length in the width direction such that the length corresponds to the width of the tool storage chamber 46. Moreover, the second sliding door 52 has a length in the width direction, in which the front side of the tool storage chamber 46 is opened.

The second sliding door 52 is disposed in front of the first sliding door 51. When the first sliding door 51 is opened, the first sliding door 51 is disposed on the inner side of the second sliding door. When the second sliding door 52 is opened, the second sliding door 52 is disposed in front of the first sliding door. Thus, the first sliding door 51 and the second sliding door 52 is formed so that one sliding door is arranged in front of the other sliding door. In a front view, one sliding door overlaps the other sliding door when the one sliding door is opened. In the machine tool 11 of the present embodiment, the first sliding door 51 and the second sliding door 52 are double sliding doors.

In the machine tool of the prior art, the door for performing an operation in the tool storage chamber is disposed on the side of the machine tool. The operator moves to the side of the machine tool when performing an operation in the tool storage chamber. Conversely, in the machine tool 11 of the present embodiment, the door for opening the machining chamber 45 and the door for opening the tool storage chamber are disposed at the front side of the frame 41. Thus, the operator can operate and inspect a device in the machining chamber 45 from the front side of the machine tool 11. Moreover, the operator can operate and inspect a device in the tool storage chamber 46 from the front side of the machine tool 11.

The operator standing in front of the machine tool 11 can perform both the operation in the machining chamber 45 and the operation in the tool storage chamber 46. In particular, the operator can perform the operation in the tool storage chamber 46 without moving to the side of the machine tool 11. Thus, the movement range of the operator decreases, thereby work efficiency is improved. Moreover, it is not necessary to form a work space for the movement of the operator on the side of the machine tool 11 and reduces the length of the installation area of the machine tool 11 in the width direction.

In the machine tool of the prior art, the operation panel of a device arranged in the tool storage chamber may be disposed on the side of the machine tool, since the operator stands on the side of the machine tool in order to perform the operation in the tool storage chamber. In other words, an operation panel may be disposed on the side of the machine tool in addition to an operation panel disposed at the front of the machine tool.

Conversely, the machine tool 11 of the present embodiment allows the operator to perform the operation in the tool storage chamber 46 and the operation outside the machining chamber 45 while standing in front of the machine tool 11. Accordingly, it is not necessary to arrange the operation panel on the side of the machine tool. The operation on the device such as the tool magazine 63 disposed outside the machining chamber 45 can be performed by the operation panel 32 disposed at the front side of the machine tool 11.

Alternatively, the structures of the door of the machining chamber and the door of the tool storage chamber may be designed so as to move from the center to the both ends in the width direction. In such a configuration, it is necessary to dispose storage containers for storing the moved doors on both ends of the machine tool in the width direction. Thus, the length of the machine tool increases in the width direction. Conversely, the machine tool 11 of the present embodiment does not require storage containers for storing the doors on both ends in the width direction, thereby the length of the machine tool 11 is reduced in the width direction.

Alternatively, the door of the machine tool may be a hinged door that opens to the front side. For example, the rotation axes can be arranged on both ends of the machine tool so that the door opens to the front side. In this case, however, an area for pivoting the door is necessary in front of the machine tool. Moreover, the cutting fluid and the chips may adhere to the inner surface of the door disposed at the front side of the machining chamber. Thus, there is a problem that the chips and the cutting fluid may fall onto the floor when the door is opened. Conversely, the machine tool 11 of the present embodiment does not require the area for pivoting the door at the front side of the machine tool 11. Furthermore, the first sliding door 51 arranged on the side of the machining chamber moves parallel to the width direction and thus can prevent the dropping of the cutting fluid onto the floor.

In particular, in the present embodiment, the second sliding door 52 is disposed in front of the first sliding door 51. When the first sliding door 51 is opened, the first sliding door 51 is disposed on the inner side of the second sliding door 52. This configuration can prevent the release of the cutting fluid and the chips out of the machine tool.

Referring to FIG. 5, in the machine tool 11 of the present embodiment, a wiper 59 is disposed at a portion where the partition wall 42a and the first sliding door 51 are opposed to each other. The wiper 59 extends in the height direction of the first sliding door 51. The wiper 59 is made of an elastic material such as rubber. The wiper 59 has a length in which the wiper comes contact with the lower end to the upper end of the first sliding door 51. The wiper 59 is fixed to the partition wall 42a. The wiper 59 is in contact with the inner surface of the first sliding door 51. The wiper 59 maintains contact with the inner surface of the first sliding door 51 even when the first sliding door 51 is moved.

As described above, by disposing the wiper 59, the chips and the cutting fluid on the inner surface of the first sliding door 51 can be removed by the wiper 59 when the first sliding door 51 is opened. The cutting fluid and the chips removed by the wiper 59 are collected by a device that is disposed at the bottom of the machining chamber 45 so as to collect the chips, etc. Furthermore, by disposing the wiper 59, the entry of the chips and the cutting fluid into the tool storage chamber 46 can be suppressed when the first sliding door 51 is opened.

In the present embodiment, the first sliding door is disposed on the inner side of the second sliding door. However, the present invention is not limited to this configuration. The second sliding door may be disposed on the inner side of the first sliding door.

Referring to FIGS. 3 and 4, the first window 53 and the second window 54 are formed so as to at least partially overlap each other when the first sliding door 51 opens. The first window 53 and the second window 54 are formed at positions so as to at least partially overlap each other when viewed from the front of the machine tool 11. By adopting this configuration, the operator can observe the inside of the tool storage chamber 46 through the second window 54 and the first window 53 when the first sliding door 51 is opened.

Referring to FIGS. 6 and 7, the first window 53 and the second window 54 are formed so as to at least partially overlap each other when the second sliding door 52 is opened. The first window 53 and the second window 54 are formed at positions at least partially overlapping each other when viewed from the front of the machine tool 11. By adopting this configuration, the operator can observe the inside of the machining chamber 45 through the second window 54 and the first window 53 when the second sliding door 52 is opened.

For example, the machining chamber 45 and the tool storage chamber 46 are separated in the machine tool 11. Thus, the operator can open the second sliding door 52 during the period in which the workpiece 1 is machined in the machining chamber 45. The operator can perform the operation in the tool storage chamber 46 during the period in which the workpiece 1 is machined. For example, the operator can change the tool 81 disposed at the tool magazine 63. At this time, the operator can observe the state of machining in the machining chamber 45 through the first window 53 and the second window 54.

Referring to FIG. 3 and FIG. 6, the first sliding door 51 has a length in the height direction, in which the front side of the machining chamber 45 is opened. The first sliding door 51 of the present embodiment has a length such that the upper portion of the machine tool is opened. The second sliding door 52 has a length in the height direction, which extends from the bottom to the top of the frame 41. The second sliding door 52 has a length such that the overall tool storage chamber 46 is opened in the height direction. As described above, the machine tool 11 is formed such that the length of the second sliding door 52 in the height direction is longer than the length of the first sliding door 51 in the height direction.

When the machining chamber 45 is opened, the chips and the cutting fluid may scatter to the outside. Thus, the door for opening the machining chamber 45 is preferably small in size. The area for opening the machining chamber 45 by the first sliding door 51 of the present embodiment is small. Conversely, the second sliding door 52 of the present embodiment is formed largely and thus facilitates the operation in the space other than the machining chamber 45, for example, the tool storage chamber 46. For example, maintenance can be performed on the hydraulic device 61 during the period in which the workpiece 1 is machined.

In the present embodiment, the length of the first sliding door in the height direction is smaller than that of the second sliding door in the height direction. However, the present invention is not limited to this configuration. The length of first sliding door in the height direction may be the same as the length of the second sliding door in the height direction. Alternatively, the length of the second sliding door in the height direction may be smaller than that of the first sliding door in the height direction.

Figure 8:
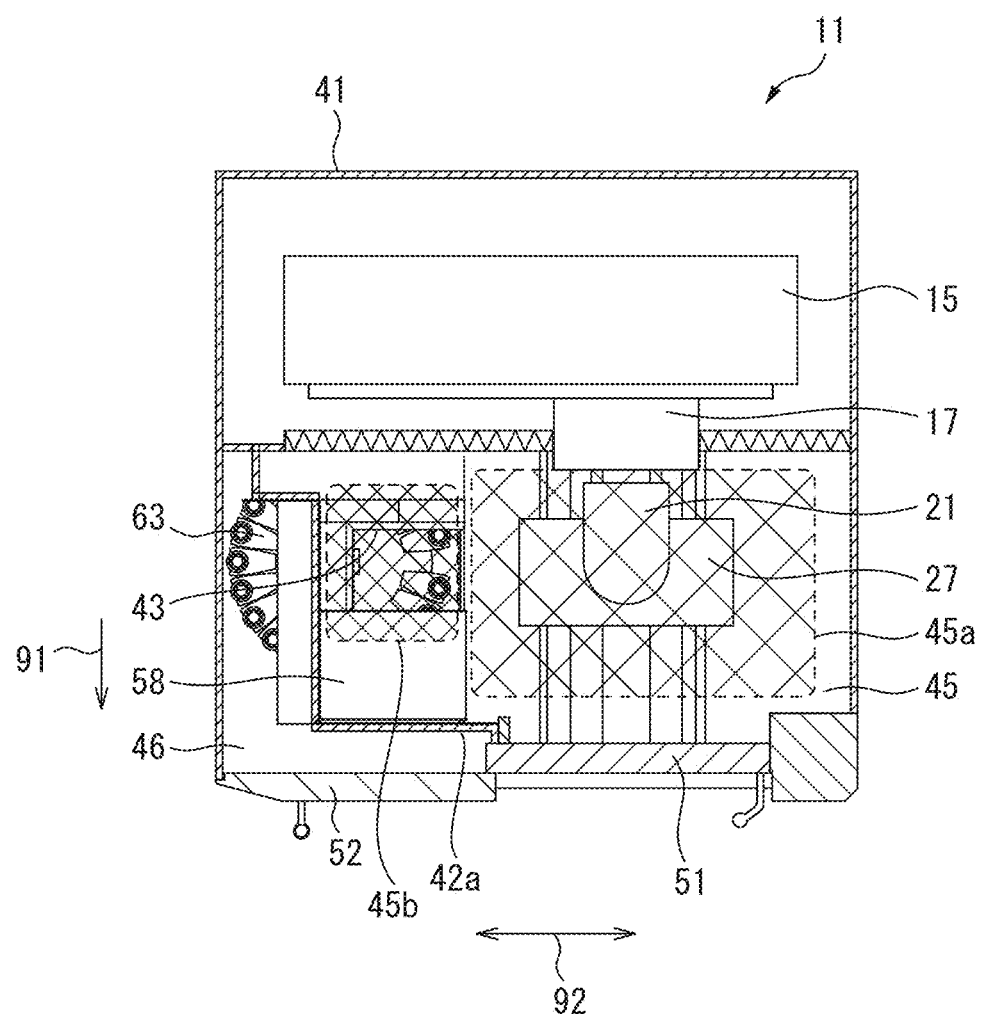
FIG. 8 is another schematic cross-sectional view of the machine tool.

FIG. 8 shows another cross-sectional view of the machine tool according to the present embodiment. The spindle head 21 of the present embodiment moves in the width direction of the machine tool 11 as indicated by arrow 92. The machining chamber 45 includes a machining area 45a for machining a workpiece and an exchange area 45b for changing the tool. The spindle head 21 and the table 27 move in the machining area 45a. The exchange area 45b is disposed on the side of the machining area 45a. The exchange area 45b is disposed on one end part of the machining chamber 45 in the width direction.

Referring to FIGS. 3, 5, 7 and 8, the tool magazine 63 is disposed below the exchange area 45b with the partition wall 42a interposed between the tool magazine 63 and the exchange area 45b. The exchange area 45b is disposed above the tool magazine 63. The partition wall 42a has an opening 43 that allows the machining chamber 45 and the tool storage chamber 46 to communicate with each other. The opening 43 is formed above the tool magazine 63. The tool exchange device includes a shutter 58 for opening and closing the opening 43 and a barrel for driving the shutter 58. The shutter 58 is disposed on the partition wall 42a. The shutter 58 is formed so as to move in the direction of arrow 101. During the period in which the workpiece is machined, the shutter 58 is closed.

When the tool 81 held by the spindle head 21 is changed, the tool magazine 63 adjusts the rotational position of the disc part 66 in order to receive the tool 81 held by the spindle head 21. A gripper that does not hold the tool 81 is disposed immediately below the opening 43 by the tool magazine 63.

The movement device places the spindle head 21 in the exchange area 45b as indicated by arrow 96. The tool exchange device opens the shutter 58, whereby the machining chamber 45 and the tool storage chamber 46 communicate with each other. The spindle head 21 then moves down through the opening 43 as indicated by arrow 97. The position of the spindle head 21 in the X-axis direction and Z-axis direction when the tool 81 is changed is determined in advance. The spindle head 21 moves downward so that the tool 81 supported by the spindle head 21 is arranged at a predetermined position in the Z-axis direction in the vicinity of the gripper of the tool magazine 63. The spindle head 21 then moves to a predetermined position in the X-axis direction, whereby the tool supported by the spindle head 21 is held by the gripper of the tool magazine 63. The spindle head 21 moves upward after releasing the tool 81.

Subsequently, the tool magazine 63 adjusts the rotational position of the disc part 66 in order to attach another tool 81 to the spindle head 21 while the spindle head 21 is separated from the tool magazine 63. The tool magazine 63 places another tool 81 immediately below the opening 43. The spindle head 21 then moves downward so as to attach the desired tool 81 to the spindle head 21. Thereafter, the spindle head 21 moves in the X-axis direction and separates from the tool magazine 63. The spindle head 21 then rises and moves another tool 81 into the machining chamber 45. By closing the shutter 58, the internal space of the machining chamber 45 is closed.

In the machine tool 11 of the present embodiment, the movement device is formed so as to move the spindle head 21 to the exchange area 45b. The exchange area 45b is disposed on the side of the machining area 45a. Moreover, the exchange area 45b is disposed above the tool magazine 63. The tool magazine 63 is disposed at a position where the tool 81 can be changed by moving the spindle head 21. Thus, a device for transferring the tool 81 from the tool magazine 63 to the spindle head 21 is not needed, whereby the length of the machine tool 11 is reduced in the width direction.

In the machine tool of the present embodiment, the second sliding door 52 for performing the operation in the tool storage chamber 46 is disposed at the front of the frame 41. It is not necessary to provide the work space for the operator on the side of the machine tool 11. Thus, another device can be disposed on the side of the machine tool 11. In particular, another device can be disposed near the machine tool 11.

Figure 9:
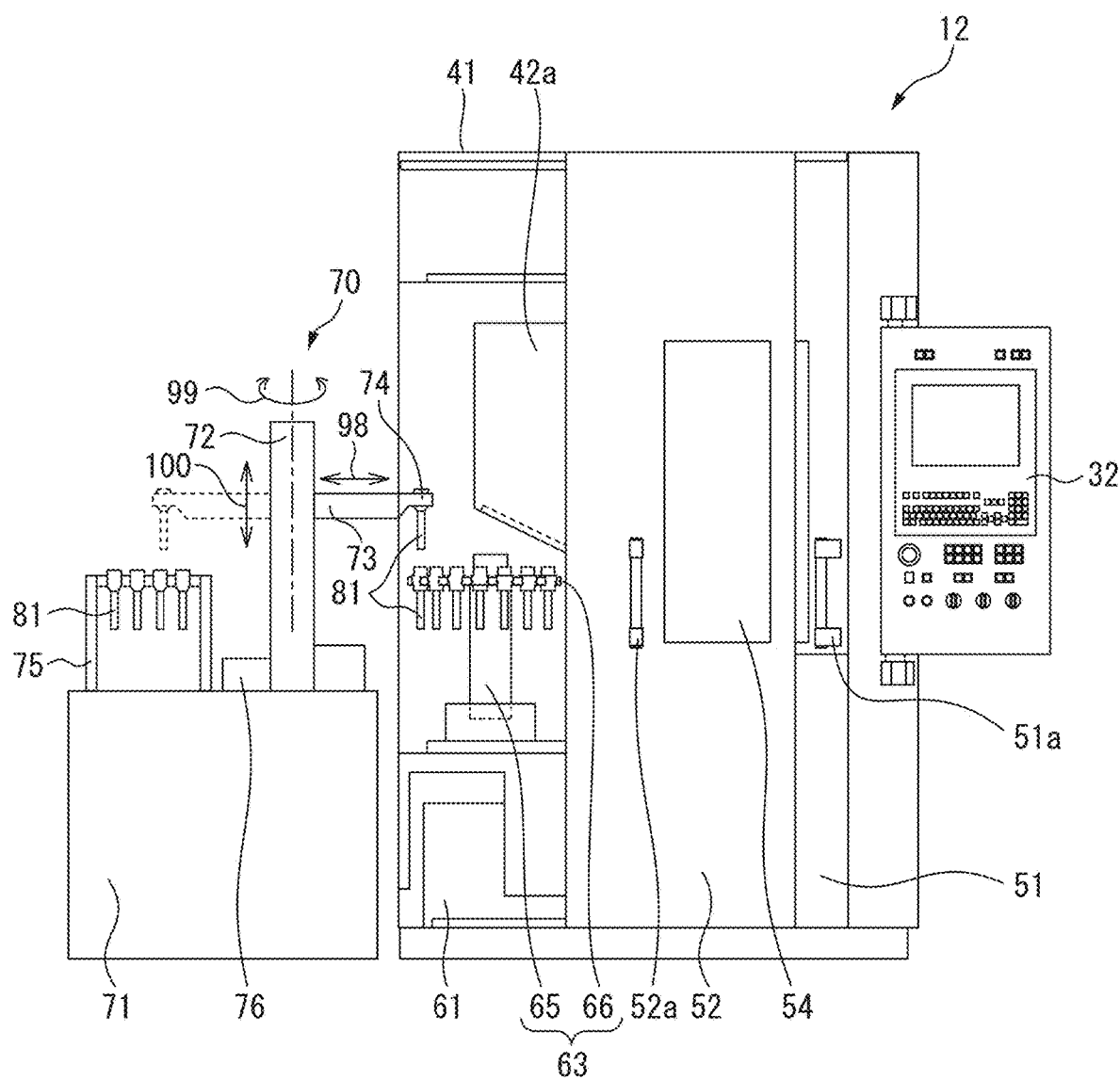
FIG. 9 is a front view of another machine tool according to the embodiment.

FIG. 9 is a front view of another machine tool according to the present embodiment. The tool exchange device for another machine tool 12 includes a robot 70 for changing the tool 81 stored in the tool magazine 63. A rack 75 for storing the tools 81 is disposed on the side of the robot 70. The machine tool 12 can store a larger number of tools than the machine tool 11.

The robot 70 includes a support member 72 supported on a pedestal 71. The support member 72 supports an arm 73. A hand 74 for holding the tool 81 is disposed at the tip of the arm 73. The hand 74 is formed so as to hold and release the tool 81.

The arm 73 of the present embodiment is formed so as to extend and retract as indicated by arrow 98. The arm 73 is formed so as to move along the support member 72 as indicated by arrow 100. The robot 70 includes a motor 76 that drives the support member 72. The motor 76 is driven so as to rotate the support member 72 about the central axis as indicated by arrow 99. The rotation of the support member 72 changes the orientation of the arm 73.

When the tool 81 placed on the rack 75 is transferred to the tool magazine 63, the robot 70 extends or retracts the arm 73 so as to retrieve the tool 81 from the rack 75. The support member 72 then rotates as indicated by arrow 99, whereby the tool 81 is transferred to the side of the gripper of the tool magazine 63. Furthermore, the arm 73 extends and the length thereof is adjusted, whereby the tool 81 is held by the gripper of the tool magazine 63. The arm 73 moves upward after releasing the tool 81.

Furthermore, the robot 70 can also retrieve the tool 81 stored in the tool magazine 63 and transfer the tool 81 to the rack 75.

As described above, in the machine tool of the present embodiment, another device can be arranged at a position near the side of the machine tool. In the machine tool 12, the side panel 41a of the frame 41 is removed and the robot 70 and the rack 75 are disposed. Thus, the number of tools stored in the tool exchange device can be easily increased. In other words, the tool capacity of the tool exchange device can be easily increased.

The device to be placed on the side of the machine tool is not limited to the device for storing the tool, and thus may be replaced with any device. For example, an identical machine tool can be disposed on the side of the machine tool. In this case, it is not necessary to provide the work space on the side of the machine tool, and thus the machine tools can be placed close to one another.

The foregoing embodiments can be arbitrarily combined. In the drawings described above, the same or equivalent parts are indicated by the same reference numerals. The foregoing embodiments are merely exemplary and do not limit the invention. The embodiments include the modifications described in the claims.

REFERENCE SIGNS LIST 11, 12 machine tool
21 spindle head
27 table
41 frame
42a partition wall
42b extendable part
43 opening
45 machining chamber
45a machining area
45b exchange area
46 tool storage chamber
51 first sliding door
52 second sliding door
53 first window
54 second window
58 shutter
63 tool magazine
70 robot
73 arm
74 hand
75 rack
81 tool

The invention claimed is:

1. A machine tool comprising:
a machining chamber for machining a workpiece; a tool storage chamber for storing a plurality of tools;
a frame containing the machining chamber and the tool storage chamber;
a partition wall disposed in the frame, the partition wall extending in a partition wall plane and separating the machining chamber and the tool storage chamber from one another;
a first sliding door disposed at a front side of the machining chamber, the first sliding door being linearly movable in a width direction of the machine tool;
a second sliding door disposed at a front side of the tool storage chamber, the second sliding door being linearly movable in the width direction of the machine tool, and
a virtual straight line extending parallel to the width direction, wherein the first sliding door is configured so as to be movable to an associated open position, wherein access through the front side of the machining chamber is provided after the first sliding door has been moved in the width direction to the associated open position,
the second sliding door is configured so as to be movable to an associated open position, wherein access through the front side of the tool storage chamber is provided after the second sliding door has been moved in the width direction to the associated open position,
the first sliding door and the second sliding door are formed so that one door is disposed on the front side of the other door,
the second sliding door overlaps the first sliding door in front of the machining chamber when the second sliding door is opened,
said virtual straight line extends from the machining chamber, through the partition wall plane, and into the tool storage chamber, and
an opening is formed in the partition wall, and the plurality of tools are movable through the opening for movement between the tool storage chamber and the machining chamber.

2. The machine tool according to claim 1, wherein
the second sliding door is disposed in front of the first sliding door, and
when the first sliding door is opened, the first sliding door is disposed on an inner side of the second sliding door.

3. The machine tool according to claim 1, wherein
the first sliding door includes a first window through which an interior of the machining chamber is viewable when the first sliding door is closed,
the second sliding door includes a second window through which an interior of the tool storage chamber is viewable when the second sliding door is closed, and
the window of one of the first and second sliding doors and the window of the other of the first and second sliding doors are formed so as to at least partially overlap each other when the one of the first and second sliding doors is opened.

4. The machine tool according to claim 1, wherein
the first sliding is configured such that the machining chamber is opened in a height direction, and
the second sliding door has a length in the height direction that extends from a bottom to a top of the frame.

5. The machine tool according to claim 1, further comprising:
a spindle head arranged in the machining chamber and being movable in the width direction of the machine tool;
a tool magazine disposed in the tool storage chamber; and
a shutter disposed on the partition wall, wherein
the opening is formed above the tool magazine and allows the machining chamber and the tool storage chamber to communicate with each other,
the shutter is formed so as to open and close the opening,
the machining chamber includes a machining area for machining the workpiece and an exchange area for changing a tool,
the exchange area is disposed on one end of the machining chamber in the width direction and is arranged above the tool magazine, and
the spindle head is formed so as to vertically move while the shutter is opened, allowing an exchange of the tool through the opening.

* * * * *